Sept. 19, 1939.  E. H. ALDEBORGH ET AL  2,173,464
COMBINED SURFACE GAUGE AND COMPARATOR
Filed April 8, 1938  2 Sheets-Sheet 1
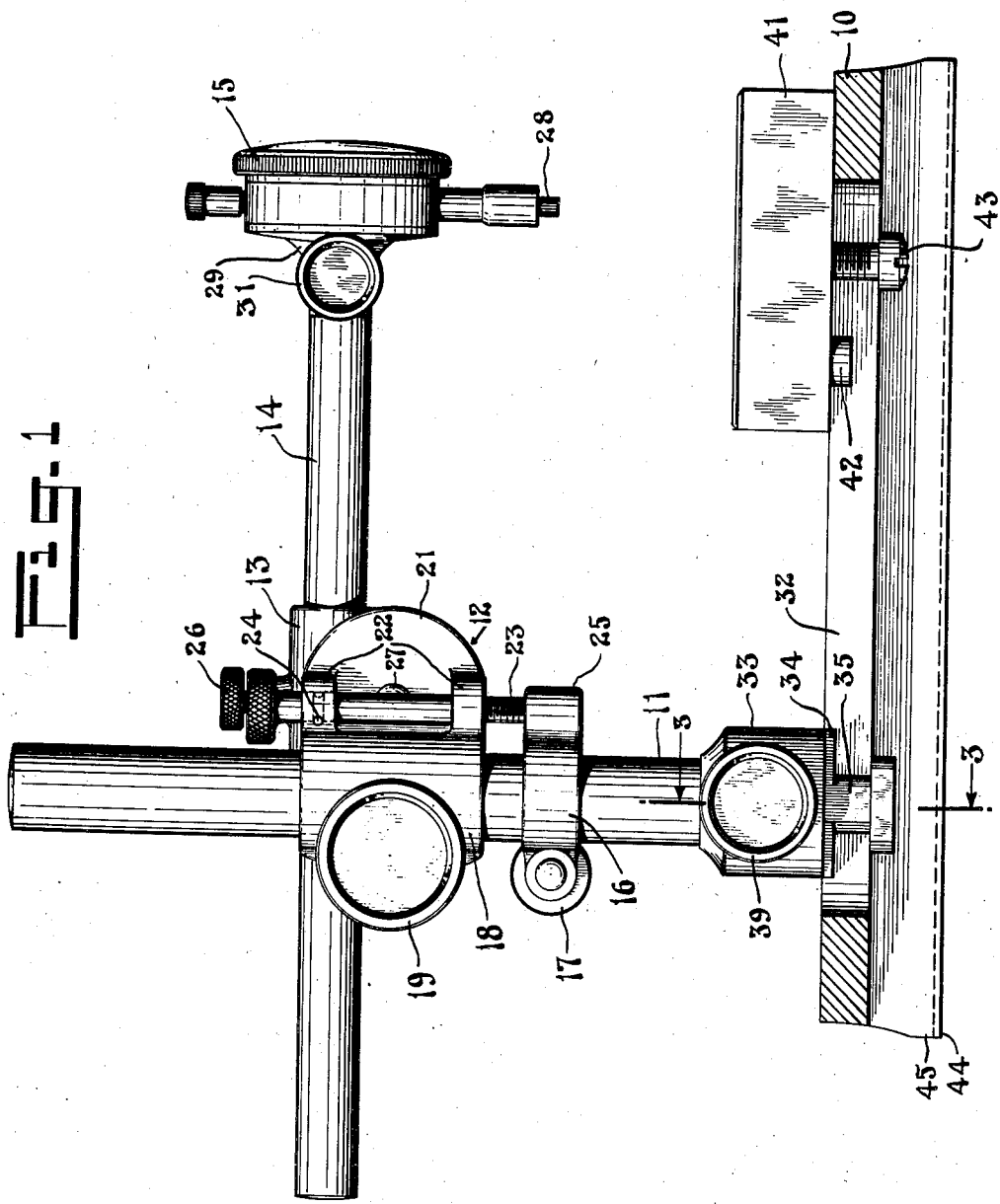
INVENTORS
Erik H. Aldeborgh
Alfred H. Emery
BY
Darby & Darby
ATTORNEYS

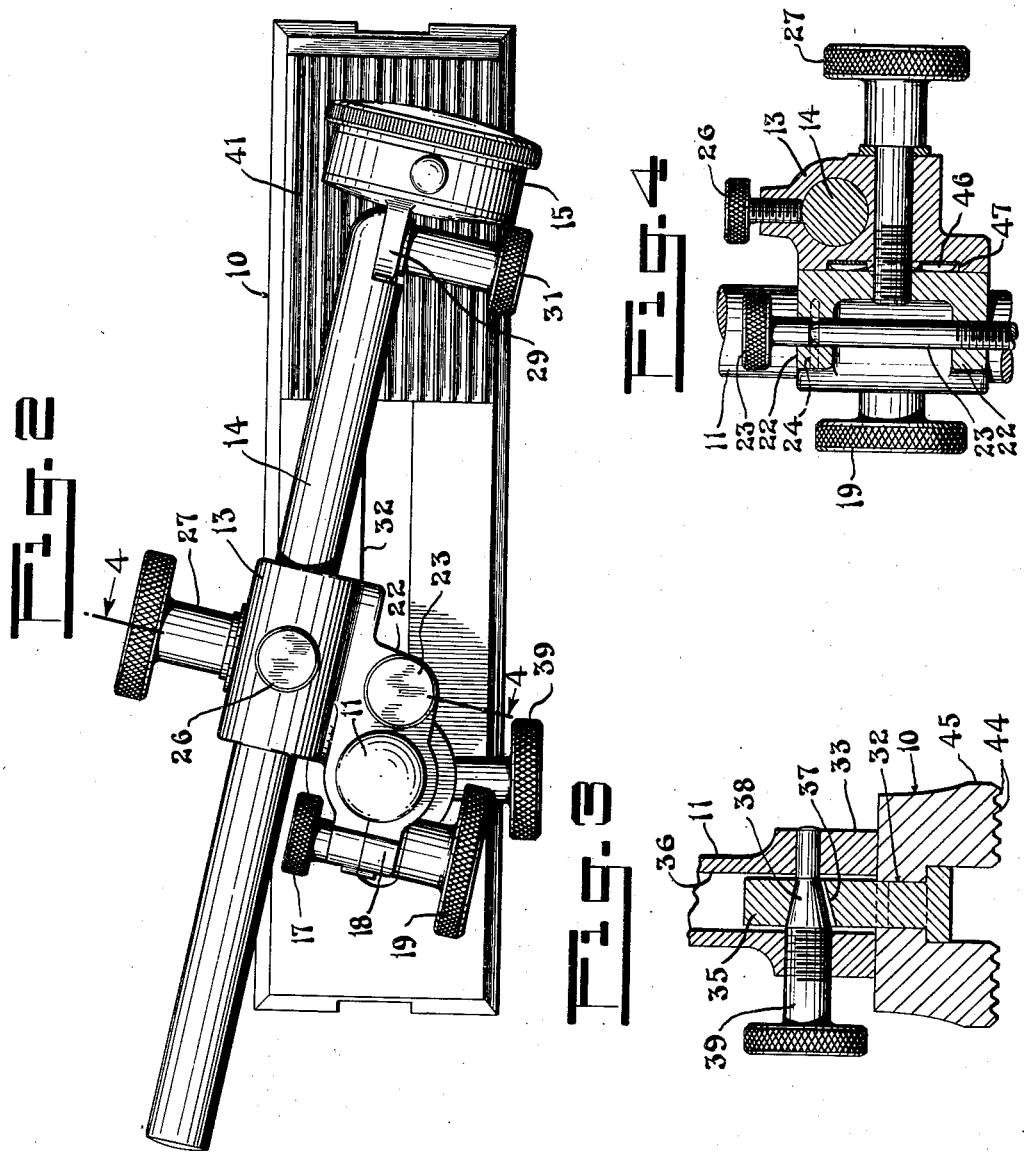

Patented Sept. 19, 1939

2,173,464

UNITED STATES PATENT OFFICE 2,173,464

COMBINED SURFACE GAUGE AND COMPARATOR

Erik H. Aldeborgh and Alfred H. Emery, Poughkeepsie, N. Y., assignors to Standard Gage Company, Inc., Poughkeepsie, N. Y., a corporation of New York Application April 8, 1938, Serial No. 200,872

2 Claims. (Cl. 33—147)

The present invention relates to an improvement in surface gauges whereby the gauge may be more accurately set and, in addition, the gauge may be used as a comparator.

This gauge is provided with a micrometer adjustment so that the indicator may be accurately set upon an article to be measured or upon a gauge block or set of gauge blocks of the Johanssen type, with a degree of accuracy not heretofore possible.

It is an object of the invention to provide a surface gauge having a micrometer adjustment to permit of accurate setting of the indicator thereof.

It is another object of the invention to provide such a surface gauge with a removable anvil block so that the gauge may be used as a comparator.

It is another object of the invention to provide a means for clamping the upright stand of the gauge to the base in such manner that the upright is readily loosened for movement along the base, and easily rigidly clamped to the base in the desired position.

A still further object of the invention is to provide a base for such an instrument having a serrated lower surface so that it will wipe any surface on which it may be used, as for example a surface plate, clean, thus preventing a film between the surface plate and the base of the gauge which would obviously affect the accuracy of the reading.

Other objects and features of the invention will appear when the following description is considered in connection with the annexed drawings, in which Figure 1 is a side elevation of the gauge structure, with the anvil block in place thereon;

Fig. 2 is a plan view of the gauge, likewise showing the anvil block in place;

Fig. 3 is a fragmentary vertical cross-section showing the serrated lower surface of the gauge base and also the mode of clamping the upright support to the base; and Fig. 4 is a fragmentary vertical cross-section in the line 4—4 of Fig. 2 showing the mode of pivoting the gauge supporting arm about a horizontal axis.

Referring now to the drawings, the gauge comprises a base 10 on which there is mounted an upright support 11, in the manner hereinafter described, which support has movably fixed thereon a clamping member 12. The member 12 is provided with a bore through a portion 13 which is pivoted to the body of the member. Through this bore extends the rod 14, at one extremity of which there is fastened a dial indicator 15. The clamping member 12 comprises a lower split clamp 16 which extends around the rod 11 and is fixed in position thereon by means of the thumb screw 17 which extends through the extremities of the clamp.

Lying immediately above member 16 is another somewhat larger split clamping member 18 which likewise extends around the upright 11 and is likewise held in position on that member by means of the thumb screw 19. The upper clamping member 18 has an extension 21 on which is pivoted the member 13 hereinbefore described.

The extension 21 likewise is provided with the integral ears 22 through which a screw 23 passes, the screw being held against movement with respect to the ears 22 by means of a groove in the portion of the screw lying within the upper ear 22 and a pin 24 extending through that ear into the groove. The threaded portion of the screw 23 threads into an extension 25 of the lower clamping member 16.

It will be obvious from the above that by clamping the lower member while the upper member is left free, a fine adjustment of the height may be obtained. This arrangement is of great advantage in the use of a gauge of the type herein disclosed since it obviates the common procedure of adjusting gauges of this type by adjusting the clamp at a point somewhere within a few fractions of an inch of the desired height and then loosening the pivot screw slightly, and tapping the end of the rod 14 with a hammer or the hand until the indicator gauge plunger just touches the surface of the gauge blocks. As will be obvious, if too hard a blow were used, the indicator would be damaged and, furthermore, it would be extremely difficult to secure an accurate adjustment.

As can be seen particularly by reference to Fig. 2, the pivot member comprises the cylindrical portion 13, already mentioned, through which there is a bore in which the rod 14 is slidable, as well as a thumb screw 26 which extends through member 13 and clamps the rod 14 in any desired position. The entire member 13, together with the thumb screw 26, pivots about a screw 27 which is provided with a knurled head for easy adjustment. This makes it possible to have the rod extend at any desired angle and to clamp the rod in position when once set.

Since it is inevitable that the user of the gauge will at some time carelessly loosen the screw 27 without supporting the rod 14, means are provided to prevent the arm from falling. In the embodiment here shown (Fig. 4) the disc-like portion of member 13 is provided with an annular depression 47 in which is placed a spring washer 46 having an undulating surface. The depression is of such depth that the washer is never completely flattened out but always retains resiliency; thus screw 27 may be loosened somewhat without permitting arm 14 to rotate.

This construction protects both the indicator 15 and the piece being gauged from damage such as might result were the plunger 28 to fall upon the article.

Since at times it is desirable that the indicator 15 be in vertical position so that the plunger 28 thereof may lie flat against the surface which is being gauged, and at other times desirable that the indicator be at an angle to the vertical, the indicator is mounted on the rod 14 through the medium of a bracket 29 extending rearwardly thereof, and lying against a flattened portion at the extremity of the rod 14, this bracket being pivotally clamped to the rod by means of a thumb screw 31 which extends through a hole in the bracket and threads into a mating thread of the rod 14.

The upright 11 on which the previously described apparatus is mounted is slidably fixed on a base 10 which base has a slot 32 extending longitudinally thereof. The upright 11 has an enlarged portion 33 on the lower edge of which there are projecting lugs 34 which extend into the slot 32 and guide the upright in its movement along the slot, as may be seen best by reference to Figure 1.

The slot 32 is enlarged at the lower surface thereof so that a T-shaped rod 35 may rest against the surface formed at the juncture of the slot with its enlargement, as shown in Figure 3. This rod extends upwardly into a bore 36 (Fig. 3) and has in the upper portion thereof a tapered hole 37 which cooperates with a tapered portion 38 of a knurled headed clamping screw 39. It will be seen that when the upright 11 and rod 35 are assembled through the base, as shown in Figure 3, and the screw 39 inserted through the holes in the upright and rod, and the screw tightened, that the rod is pulled upwardly to clamp the upright solidly against the base.

It will be obvious that the upright may be moved along the base to any desired position and likewise be obvious that the arm 14 may extend from the base in any direction and may be at a right angle to the upright 11 or at any desired angle, so that by properly positioning the upright on the base the indicator may be positioned to cooperate with the removable anvil block 41 or may be moved aside to cooperate with an object positioned on the same surface on which the base 10 is placed.

The anvil block 41 is a hardened steel block having a small button 42 on its lower surface which fits in the slot 32 of the base to guide the block for movement longitudinally of the base. The block is prevented from pivoting about the button 42 and is clamped to the base 10 by means of a screw 43 which extends through the slot and threads into the anvil block. In some instances it is desirable that the block 41 be rotatable; if if this be true the button 42 is omitted.

It should be noted that the upper surface of the anvil block is serrated, the serrations being rounded at their lower edges and being perfectly flat on top so that a flat surface is presented on which an article to be gauged may be placed or gauge blocks may be placed to provide the original setting for the instrument. These serrations are of the type disclosed in United States Letters Patent No. 1,946,432 issued February 6, 1934, to Erik H. Aldeborgh, and provide a surface on which gauge blocks may be located without a tendency to stick and without the common disadvantage in such blocks, namely, that a layer of grease or dirt may accumulate between the anvil block and the gauge blocks to render the reading incorrect. In other words, the serrations provide spaces in which grease or dirt which has accumulated on the base of the anvil block or the gauge blocks may be scraped off, thus forming a perfect union between the anvil and the gauge blocks so that the indicator 15 may be correctly positioned.

If desirable an anvil block having a V-shaped groove such as frequently used for checking cylinders may be substituted for block 41 or, in fact, any desirable form of anvil block may be utilized.

The base 10 is provided with serrations 44 of the same type as those on anvil block 41 so that in moving the base over a surface plate the plate will be wiped clean and an accurate reading of the indicator assured. In addition the base is carefully machined along the sides at portions 45 so that the gauge may be utilized to check parallelism of parts of a structure.

The instrument of this invention is particularly advantageous when a piece is being made the largest dimension of which is most readily gauged by placing it on a surface on which the base 10 likewise rests, and having set the indicator in conjunction with gauge blocks to give a proper reading, the gauge may be moved and the plunger 28 thus positioned upon the article to determine when it lies within the limits of tolerance in force.

If the article likewise has, for example, a cylindrical projection thereon, the projection may be placed upon the anvil block 41 and by rotating it upon that block, with the gauge 28 resting upon a surface, a determination made as to whether this cylindrical portion is true and within the limits specified. Of course many other uses of such a combined gauge and comparator are possible, and other similar arrangements for providing a combined gauge and comparator having means for accurately adjusting the instrument are possible.

We desire, therefore, to be limited not by the foregoing specification, but solely by the appended claims.

What we claim is:

1. In a surface gauge and comparator, the combination of a base member, an upright member, and means for fastening said upright to said base, said means comprising a shouldered slot in said base and a bar having a head extending across said slot, said bar extending upwardly through said slot into said upright member and having a tapered hole through the upper portion thereof for cooperation with a screw having a tapered projection extending into said tapered hole said screw threading into said upright member.

2. In a device of the class described, a base, an indicator, means for adjustably fixing said indicator with respect to said base, and means for mounting an anvil block upon said base, said means comprising a slot in said base, a button on said block extending downwardly into said slot and a screw having a large head, said screw extending upwardly through said slot and threading into said block, the head of said screw lying against the lower edges of said slot.

ERIK H. ALDEBORGH.
ALFRED H. EMERY.